US007962851B2

(12) United States Patent
McAfee et al.

(10) Patent No.: US 7,962,851 B2
(45) Date of Patent: Jun. 14, 2011

(54) METHOD AND SYSTEM FOR CREATING SUPERIOR INFORMATIONAL GUIDES

(75) Inventors: Preston McAfee, San Marino, CA (US); Andrew Tomkins, San Jose, CA (US); Shanmugasundaram Ravikumar, Berkeley, CA (US)

(73) Assignee: Yahoo! Inc., Sunnyvale, CA (US)

( * ) Notice: Subject to any disclaimer, the term of this patent is extended or adjusted under 35 U.S.C. 154(b) by 910 days.

(21) Appl. No.: 11/872,852

(22) Filed: Oct. 16, 2007

(65) Prior Publication Data
US 2009/0100381 A1 Apr. 16, 2009

(51) Int. Cl.
*G06F 15/00* (2006.01)
*G06F 13/00* (2006.01)
(52) U.S. Cl. ........................................ 715/702; 715/736
(58) Field of Classification Search .......... 715/763–765, 715/738–741, 851–853, 702, 736
See application file for complete search history.

(56) References Cited

U.S. PATENT DOCUMENTS

| 6,009,410 A | * | 12/1999 | LeMole et al. ............. 705/14.54 |
| 6,144,944 A | * | 11/2000 | Kurtzman et al. .......... 705/14.54 |
| 2004/0254857 A1 | * | 12/2004 | Onizuka ........................ 705/27 |
| 2007/0185744 A1 | * | 8/2007 | Robertson ........................ 705/5 |

FOREIGN PATENT DOCUMENTS

| KR | 10-2001-0027764 | 4/2001 |
| KR | 10-2003-0014948 | 2/2003 |
| KR | 10-2005-0089248 | 9/2005 |
| KR | 10-2005-0092062 | 9/2005 |
| WO | WO 2009/051946 A1 | 4/2009 |

OTHER PUBLICATIONS

International Search Report and Written Opinion of the International Searching Authority for International Application No. PCT/US2008/077599, dated Mar. 31, 2009 (11 pages).

* cited by examiner

*Primary Examiner* — Cao "Kevin" Nguyen
(74) *Attorney, Agent, or Firm* — Nathan O. Greene; Brinks Hofer Gilson & Lione

(57) ABSTRACT

A method for creating informational guides includes receiving a guide specification and a guide content for a plurality of guides; publishing the plurality of guides to a Web-based network for access to users of the network; serving advertising to the plurality of published guides; and rewarding owners of the plurality of published guides by providing compensation thereto based on revenue from the served advertising.

22 Claims, 4 Drawing Sheets

METHOD AND SYSTEM FOR CREATING SUPERIOR INFORMATIONAL GUIDES

BACKGROUND

1. Technical Field

The disclosed embodiments relate to a method and system for creating superior guides, and more particularly, to a method and system to create incentives for Internet users to contribute to the body of online guides by creating competition and reward for doing so.

2. Related Art

The Internet is full of information in forums, in wikis, on company websites, in blogs, etc. A wiki is a medium which can be edited by anyone with access to it, and provides methods for linking from one page to another. Wikis are typically collaborative websites. Blogs are websites where entries are written in chronological order and commonly displayed in reverse chronological order. Many blogs provide commentary or news on a particular subject such as food, politics, or local news; others function as more personal online diaries. A typical blog combines text, images, and links to other blogs, web pages, and other media related to its topic. On the Internet, simple information is oftentimes buried in voluminous manuals, while other information is buried in lengthy forum threads. Wrong answers to simple questions abound, and the accuracy of much of the published content on the Internet is questionable.

Search engines rarely discriminate between good answers and poor ones. Search engines are more interested in finding relevance, not accuracy. Searching a simple question on even a narrow topic such as replacement of the power supply fan in a Dell Dimension XPS personal computer may yield a dozen conflicting answers and require hours of research. One problem encountered is how to find and assess the reliability and usefulness of the plethora of information typically found through Internet searching.

For instance, many searches are investigations such as what one needs to know to buy a washer and dryer, or why Pluto is not technically considered a planet. Other investigations may include finding out what is fun to do in Singapore, why a computer has a virus, and how to adopt a baby from another country. The normal way such searches are usually performed is to enter a handful of keywords as part of a search request to an online search engine or similar resource. If one is lucky, a site in the first few results may or may not be authoritative, but may appear to answer the question. Often, however, more searches are required; even then, the answer is often complex and may require understanding some preliminary principles or related facts.

Modern search is limited by the form of the content. It is not by accident that the Wikipedia internet encyclopedia, available on the World Wide Web at wikipedia.org, dominates the top entries for factual or informational searches, because there is a thirst for such information and few other websites with the volume or detail of the Wikipedia encyclopedia. The Wikipedia encyclopedia, however, has no competition between entries, and even if there were, there is no mechanism for users to express their evaluations. Indeed, the Wikipedia database generally contains only one entry on a given subject that is revisable by anyone. Furthermore, the Wikipedia online resource is limited to encyclopedia-type entries, and hence, does not have information about a variety of topics that may interest many consumers of Internet information.

SUMMARY

By way of introduction, the embodiments described below are drawn to a method and system for creating superior guides, and more particularly, to a method and system to create incentives for Internet users to contribute to the body of online guides by creating competition and reward for doing so.

In a first aspect, a method is disclosed for creating informational guides, including receiving a guide specification and a guide content for a plurality of guides; publishing the plurality of guides to a Web-based network for access to users of the network; serving advertising to the plurality of published guides; and rewarding owners of the plurality of published guides by providing compensation thereto based on revenue from the served advertising.

In a second aspect, a method is disclosed for creating informational guides, including receiving a guide specification having a monetization policy along with guide content from a plurality of guide owners as submissions of a plurality of guides; publishing the plurality of guides to a Web server for display to users of a Web-based network along with served advertising; recording user consumption information of the plurality of guides related to monetizable events; and computing revenues earned by at least some of the plurality of guides according to the respective monetization policies.

In a third aspect, a method is disclosed for creating informational guides, including receiving from a guide owner one or more pieces of content for a guide; receiving from the guide owner information with which to identify one or more pieces of structured external content; incorporating the structured external content into the content of the guide; and publishing the guide to a Web-based network for access by consuming users.

In a fourth aspect, a system for creating informational guides includes a guides online server, which includes a guide creator operative to receive guide specifications and guide content and create a plurality of guides as specified by a plurality of guide owners, wherein each specification includes at least a monetization policy submitted by a corresponding guide owner that to create incentives for quality guide creation. A guide consumption director is operative to publish the guides on a Web-based network as created by the guide creator and to enable at least one of searching and browsing for guides of varying subject matter. A logger is operative to log consumption information of the guides by Web-based users of the guides. A guides content database stores the content of the created guides, wherein related guides are associated in memory with each other. A guides consumption log database stores the log consumption information gathered by the logger.

Where the specification of each guide includes a monetization policy, the system may further include a guides offline server having a reputation computer operative to compute a quality of each guide within a particular setting, which is based on at least user ratings. An index builder is operative to use at least the guide content and the related specifications to build an index that is operative to respond to search queries and browsing actions. A payment operator operative to implement the monetization policies, including paying revenues to the owner or delegates of the guides based on consumption of advertising served with each guide. A guides search index database stores the index built by the index builder.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION

Figure 1:
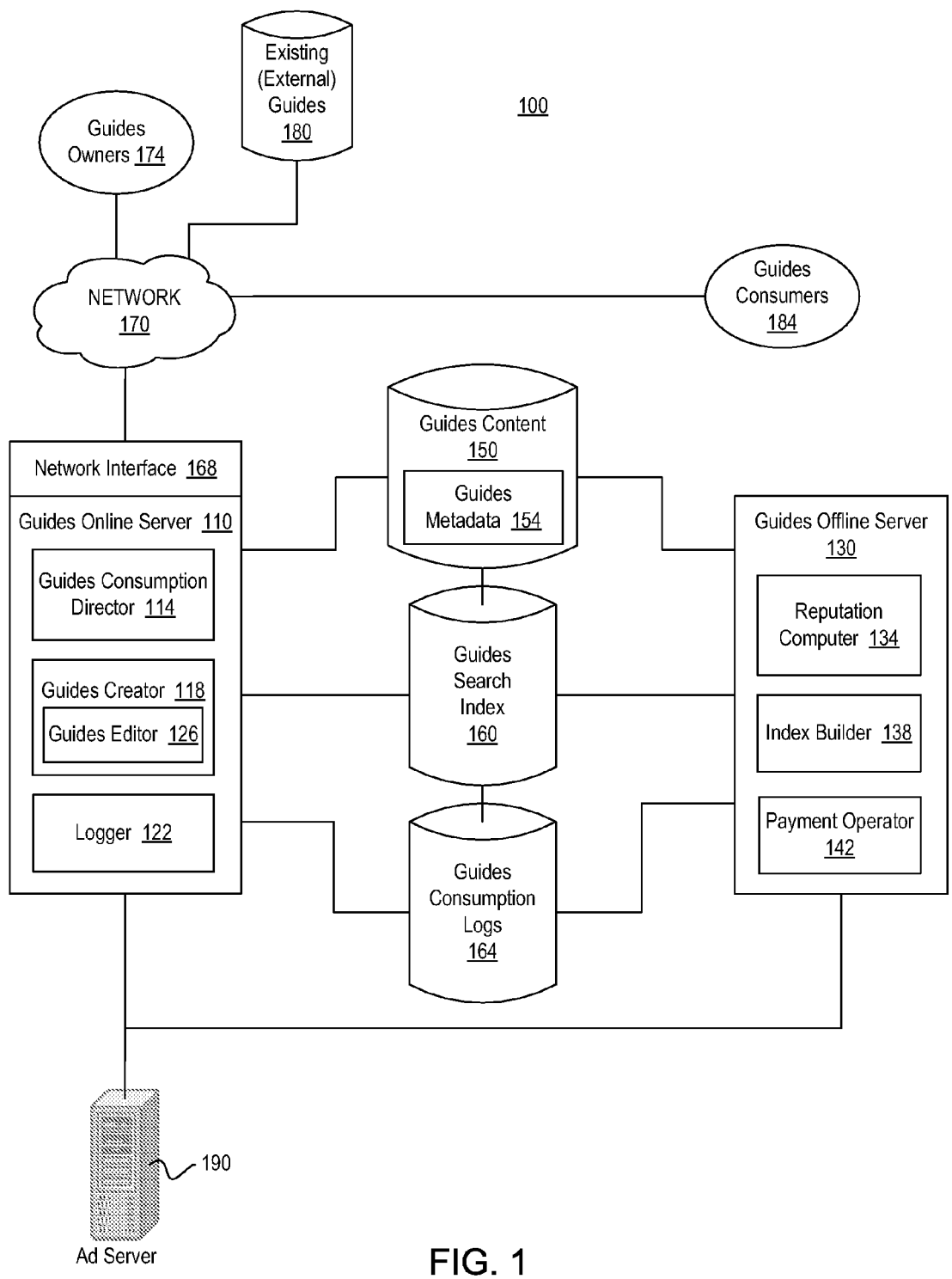
FIG. 1 is a diagram of a system for creating superior informational guides.

In the following description, numerous specific details of programming, software modules, user selections, network transactions, database queries, database structures, etc., are provided for a thorough understanding of various embodiments of the systems and methods disclosed herein. However, the disclosed system and methods can be practiced with other methods, components, materials, etc., or can be practiced without one or more of the specific details. In some cases, well-known structures, materials, or operations are not shown or described in detail. Furthermore, the described features, structures, or characteristics may be combined in any suitable manner in one or more embodiments. The components of the embodiments as generally described and illustrated in the Figures herein could be arranged and designed in a wide variety of different configurations.

The order of the steps or actions of the methods described in connection with the disclosed embodiments may be changed as would be apparent to those ordinarily skilled in the art. Thus, any order appearing in the Figures, such as in flow charts, or in the Detailed Description is for illustrative purposes only and is not meant to imply a required order.

Several aspects of the embodiments described are illustrated as software modules or components. As used herein, a software module or component may include any type of computer instruction or computer executable code located within a memory device and/or transmitted as electronic signals over a system bus or wired or wireless network. A software module may, for instance, include one or more physical or logical blocks of computer instructions, which may be organized as a routine, program, object, component, data structure, etc. that performs one or more tasks or implements particular abstract data types.

In certain embodiments, a particular software module may include disparate instructions stored in different locations of a memory device, which together implement the described functionality of the module. Indeed, a module may include a single instruction or many instructions, and it may be distributed over several different code segments, among different programs, and across several memory devices. In some embodiments, modules may be combined within an integrated set of instructions. Some embodiments may be practiced in a distributed computing environment where tasks are performed by a remote processing device linked through a communications network. In a distributed computing environment, software modules may be located in local and/or remote memory storage devices.

As discussed above, an online search of the Internet is often a poor way to find useful or accurate information. Often what is needed is a guide that details the information sought in a document, which may include links to related, relevant information. There are currently no good online tools that would allow a source of guides to be vetted by users.

There are thousands of subjects and classifications of online informational guides. Some of them include: products (e.g., iPod); services (e.g., roof repair); websites (e.g., humorous sites, Jerry's excellent guide to the World Wide Web); entertainment (restaurants in Madrid, the TV show "Desperate Housewives"); local (family activities in Singapore); science (the solar system); technology (how to install a disk drive); history (Harriet Tubman); sports (MLB statistics); and many more.

FIG. 1 is a diagram of a system 100 for creating superior informational guides. The system 100 includes a guides online server 110, a guides offline server 130, databases, a network 170 and an ad server 190. The embodiment of FIG. 1 is intended to be illustrative only.

The guides online server 110 has a guides consumption director 114, a guides creator 118, and a logger 122. The guides creator 118 includes a guides editor 126. The guides offline server 130 has a reputation computer 134, an index builder 138, and a payment operator 142. Both the guides online server 110 and the guides offline server 130 are coupled with a number of databases, which may include a guides content database 150 having also stored therein guides metadata 154, a guides search index database 160, and a guides consumption log database 164. Herein, the phrase "coupled with" is defined to mean directly connected to or indirectly connected through one or more intermediate components. Such intermediate components may include both hardware and software based components. Note that the databases 150, 160, and 164 may be a single database logically or physically or may be arranged as distributed storage as shown.

The guides online server 110 includes a network interface 168 to communicate over a network 170 with a plurality of guides owners 174 and a plurality of existing, external guides 180, which may be stored in any number of locations accessible over the Internet by the network interface 168. Note that guides owners 174 are also considered "creators" of the guides, but are not called "guides creators" to distinguish from the "guides creator" 118 of the guides online server 110 as referred to herein. The existing, external guides 180 may be stored on Web servers, file servers, networked databases, hard drives, or other networked storage (all not shown). A plurality of guides consumers 184 include users of the Internet or other local networks having access over the network 170 to the guides online server 168 to consume the guides created, imported, or linked to through the network interface 168 of the system 100. The network 170, therefore, may include any one, or a combination of, a local area network (LAN), a wide area network (WAN), an intranet, an extranet or other network.

The guides consumption director 114 allows guides consumers 184 to consume guides content, and handles viewing of the guide, searching for a guide, rating a guide, etc., from a front end of the system 100. The guides creator 118 allows the guides owners 174 or those delegated by the guides owners 174 (hereinafter "delegates") to specify details about the guides, handle administrative information, and send content that the guide editor will use to create new guides or add to or edit existing guides. The creation and editing of a guide will be discussed in more detail with reference to FIGS. 2A and 2B. The Internet user consumption of the guides will be discussed in more detail with reference to FIG. 3. The logger 122 captures information about how the guides consumers 184 consume the guides; this logged information becomes a part of what the guides offline server 130 uses to rank the quality of the guides, among other functions.

The guides offline server 130, which is coupled with the guides online server 110, performs long-running batch computations in the backend of the system 100. The reputation computer 134 computes the "quality" of each guide within a particular setting based on, among other things, user ratings, consumption information, and content. The index builder 138 uses guide content and other information (such as the logged information based on consumer 184 consumption discussed above) to build an index capable of responding to search queries and browsing actions.

An ad server 190, if not incorporated into the guides online server 110, will be coupled therewith to serve advertising to the guides published over the network 170. Advertisements served to the published guides would respect the wishes of the guides owners 174, e.g., no Exxon-Mobil™ ads served on the *Guide to Global Warming*. Serving of advertisements makes possible the monetization aspect of the system 100: monetizable events will be logged by the logger 122 and revenue associated therewith will be computed by the payment operator 142. The payment operator 142 implements a series of monetization steps, causing money or credits to flow to the guide owners 174 and/or delegates based on consumption of advertising associated with the guides owned by the respective guides owners 174. The aspects of handling guide monetization will be covered in more detail with reference to FIG. 4.

Figure 2A:
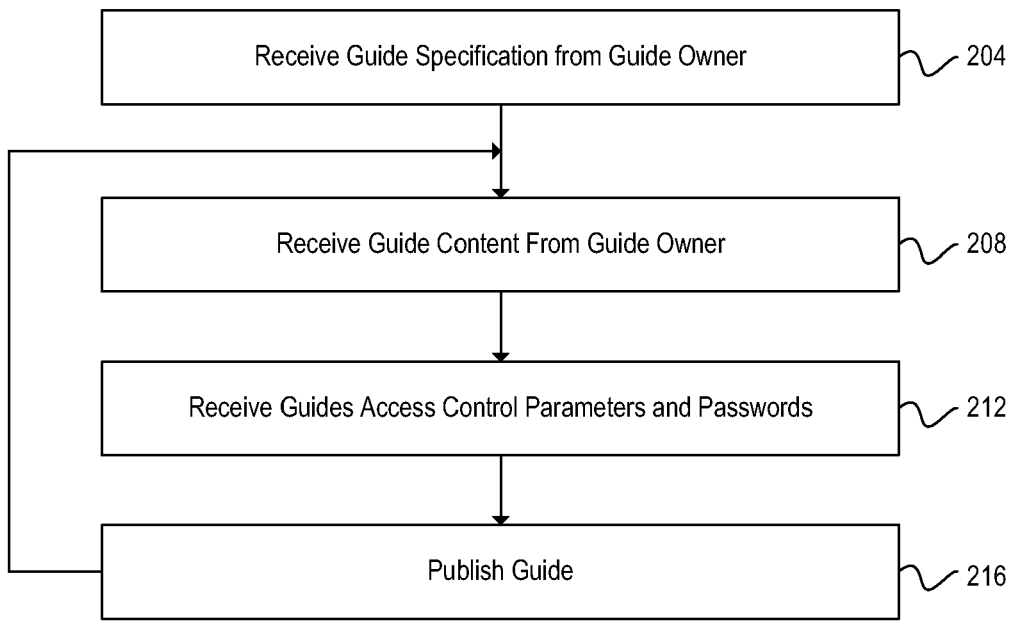
FIG. 2A is a flow chart of an exemplary method for guide creation using the system depicted in FIG. 1.

FIG. 2A is a flow chart of an exemplary method for guide creation using the system 100 depicted in FIG. 1. At block 204, the guide creator 118 receives a specification from a guide owner 174 over the network interface 110. The specification includes a name for the guide, information about how it should be monetized, and optionally some keywords, a category, a short description, a summary of the authors' qualifications, etc. At block 208, the guide creator 118 receives guide content from the guide owner 174, which is received when the guide owner 174 interacts with the guide editor 126. At block 212, the guide editor 126 receives access control parameters and associated passwords for specified delegates.

That is, the guide editor 126 allows different types of access control to different parts of the guide, which may implemented for instance through providing a password to a delegate for the delegate's area and level of access permission. Because some guides will include multiple pages and/or different sections, to include a table of contents, various pages and/or sections may include distinct write access control and responsibility for those sections may be apportioned to different delegates. Open, Wikipedia-style guides that are publicly editable by anyone include passwords published on the guides themselves for publicly-accessible editing.

The guide editor 126 optionally provides specialized support for certain guide categories, such as a how-to guide, a trip planning guide, a product purchase guide, etc. At block 216, the guide is published, making the guide available to whatever audience has the rights to view it. By default, each guide that is created is publicly available in full unless otherwise limited by the guide owner 174.

The form of guide creation may involve an indexed page stored in the guides search index 160, content of which is stored in the guides content database 150. Tools for creation and editing are accessible through the guides editor 126 and may include support for existing Microsoft Word, wiki, html, or pdf formats. Topic and index meta-data may also be created by the guides editor 126, which can then be stored in the guides search index database 160, accessible by the index builder 138. A guide owner 174 may tag a guide as appropriate for other topics or keywords. A "guide-of-guides" feature may be implemented to allow guides to be aggregated by way of the index builder 138 and the guides search index database 160.

The guide-of-guides links related guides together through memory reference and as displayed for consumption through the guides consumption director 114, thus allowing guides consumers 184 to browse to or link between related guides. The guide-of-guides feature would also work directly with the guides editor 126 of the guides creator 118 to allow creation of a separate guide that is void of unique content, but that summarizes/distinguishes the guides of a particular topic and provides a commentary related thereto. A guides owner 174 that creates such a guide-of-guides page may have its own unique value that may also merit service of advertising thereto.

The system 100 may also implement a wiki that lets the guides owners 174 invoke search engine "pipes" to bring content from elsewhere into a page of a guide by the guides editor 126. The term "pipes" refers to sources of data that may be linked to from another source, such as a data objects or Web server database (not shown).

Figure 2B:
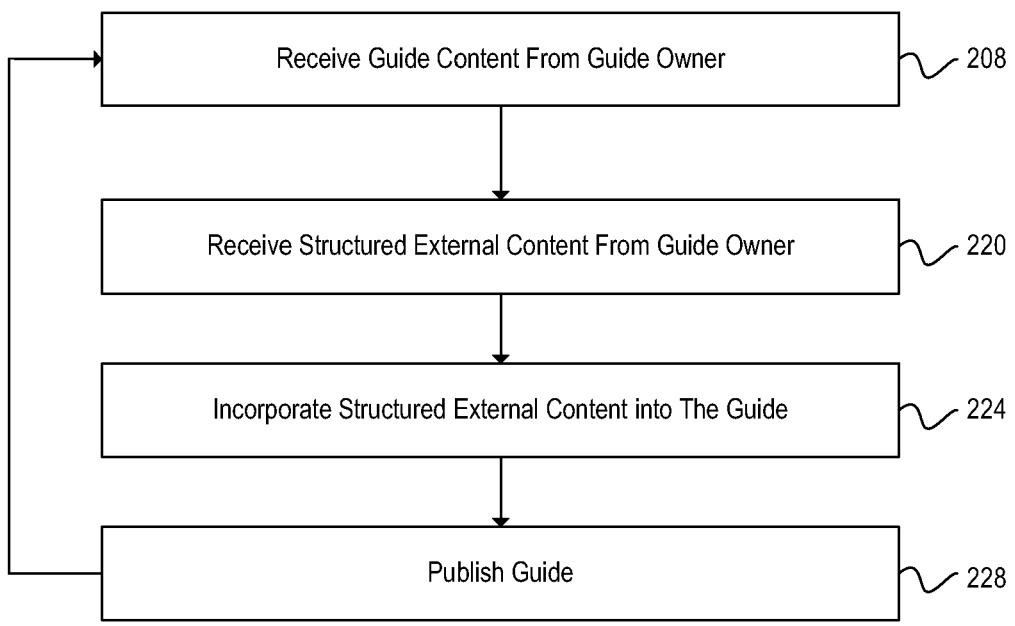
FIG. 2B is a flow chart of an exemplary method for guide creation that incorporates structured external content using the system depicted in FIG. 1.

FIG. 2B is a flow chart of an exemplary method for guide creation that incorporates structured external content using the system 100 depicted in FIG. 1 by way of a process called inlining, or providing links inside of content to external advertisements. Here, the term "external" means external to the guide and may include structured content accessible locally to the guides online server 110 in addition to structured content accessible over the network 170. As in FIG. 2A, at block 208, the guides editor 126 receives from a guide owner 174 one or more pieces of content for a guide to be created. At block 220, the guides editor 126 receives from the guide owner 174 information with which to identify one or more pieces of structured external content, such as a data object or a hyperlink to such a data object. At block 224, the guides editor 126 then incorporates the structured external content into the guide content before it is published to the Web-based network 170, at block 228, via the guides consumption director 114 for consumption by the guides consumers 180.

The guides consumers 180 are allowed to interact with the incorporated structure by either viewing/accessing the data object directly, or by linking through the hyperlink to the data object. An example of a data object includes a high-definition television (HDTV) available online by a electronics retailer such as Best Buy, or a review of HDTVs conducted by PC World Magazine. The structured external content may be incorporated into a predetermined or specific frame (not shown) of a guide that communicates with at least one external data object.

Yet another feature of the guides creator 118 is the ability to import the existing, external guides 180 so that they, too, may be accessible to the guides consumers 184. There are at least two ways in which already-created, external guides 180 may be imported. One includes importing "by reference," wherein a link to the location of the external guide 180 is passed to the guides creator 118 by the guides owners 174. This link (as discussed with reference to FIG. 2B) may be incorporated into another guide created by the guides editor 126 or may simply be stored in the guides search index database 160 for access through searching. Whether a guides consumer 184 finds the link reference through searching or browsing to another guide, the result is the same. The guides consumer 184 accesses the guide through a call from an Internet browser to a third party hosting site (not shown) of the guides owner 174, wherein the network interface 168 pulls the external guide 180 into the guides online server 110 and makes it available to the guides consumer 184. An IFRAME tag of the Internet browser of the guides consumer 184 may be used to automatically make the external call when the link is selected. When a guide is accessed through importation by reference, the guide is not editable by anyone except the guides owner 174 having access to the external guide 180 so imported.

Another way to import an existing, external guide 180 is through importing "by value." When this method is used, the guides owner 174 instructs the external guide 180 to be imported into the guides online server 110, which causes a copy to be made and the guide to be stored locally in the guides content database 150. After importation by value, the guide becomes accessible through the guides editor 126 for revision and updating according to permission granted to delegates or others.

Figure 3A:
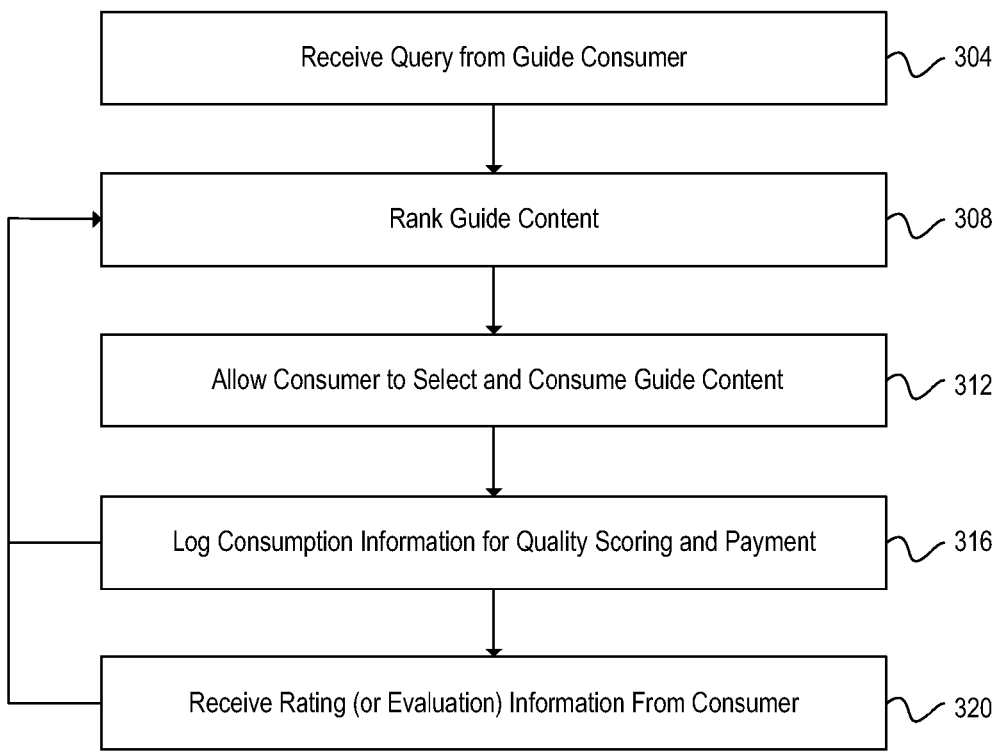
FIG. 3A is a flow chart of an exemplary method for guide consumption using the system depicted in FIG. 1.

FIG. 3A is a flow chart of an exemplary method for guide consumption using the system 100 depicted in FIG. 1. At block 304, the guides consumption director 114 receives a query from a guides consumer 184. At block 308, the guides consumption director 114 in concert with the reputation computer 134 ranks the guide for display in a list of search results to the guides consumer 184. Ranking includes consideration of a variety of factors to improve relevancy of search results. The factors may include, but are not limited to, guide content, logged consumption information, ratings provided by guides consumers 180, and monetization information provided when the guide was created. Monetization information, if allowed to influence a ranking, may do so in at least two ways. One way is to allow guides consumers 184 to stipulate that content that generates more revenue is more accurate, and thus ranked higher. Another option is to co-optimize for revenue and consumer satisfaction in which guides that generate more revenue are ranked slightly higher, and that consumer satisfaction, based on ratings and evaluation discussed below, is made a primary factor.

Gathering the information that informs ranking factors, for the most part, is an iterative process, which explains why the feedback loops come from blocks 316 and 320, discussed blow, back into block 308. Note also that the method of FIG. 3 is specific to search-based guide access, but guides may be consumed by browsing or by direct access through a Uniform Resource Locator (URL), and in each case this information may be gathered and monetization events may occur.

At block 312, the guides consumer 184 is allowed to select and consume the guide and its content. At block 316, the logger 122 logs consumption information for quality scoring and payment purposes. Normally, advertisements (ads) are served with the guides that make monetization possible. The logged consumption information may include clicks, dwell time, or other information about how a user consumes a guide or views/accesses an ad. As discussed, the logged information is stored in the guides consumption logs database 164, and made available for ranking (block 308).

At block 320, the guide online server 110 receives rating or evaluation information from the guides consumer 320. Rating information may include at least a simple rating, such as on a scale from 1-5, or adjectively scaled as "excellent," "good," "fair," "mediocre," and "bad." Ratings may be used to assess skill levels of the guides so that appropriate guides are suggested in the future, e.g., further related guides on a topic may be suggested to meet varying levels of skill that guides consumers 184 may have. The guides consumers 184 that have accounts with the system 100 may be logged into the guides online server 110, in which case the guides consumers 184 may also give a detailed evaluation that may be visible, along with cumulative ratings, to other consumers 184 that later consume the guide. Ratings and evaluations will help the system 100 to properly rank, according to relevance, accuracy, and usefulness, the related guides for which a guides consumer 184 may be seeking.

Such evaluations and ratings may further be weighted based on a reputation level correlated with rating guides consumers 184. A guides consumer 184 that consistently is negatively correlated with the overall population of guides consumers 184 may have the system 100 reduce the weight of their ratings and evaluations. Such correlations in evaluations to predict what any given consumer 184 would like may be implemented through an eigenvector approach as would be apparent to those ordinarily skilled in the art. The ratings and evaluation information is stored in the guides consumption logs 164, and made available for ranking (block 308). Prizes or a largest percentage of revenue sharing for served ads may be granted to the highest ranked guides.

Figure 3B:
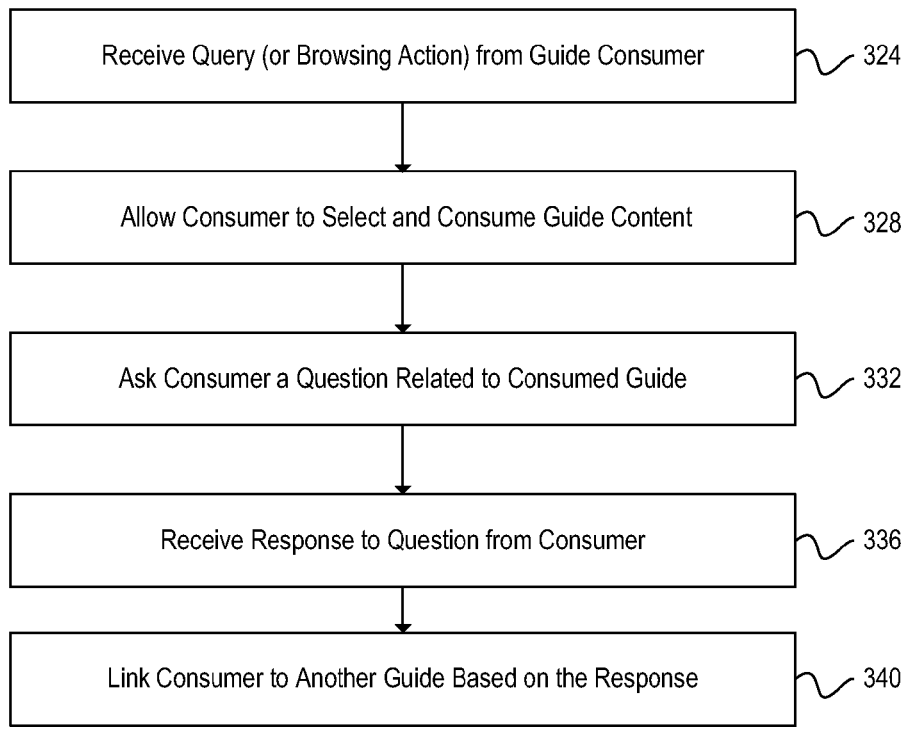
FIG. 3B is a flow chart of an exemplary method for guide consumption that is based at least in part on questioning a guide consumer.

FIG. 3B is a flow chart of an exemplary method for guide consumption that is based at least in part on questioning a guides consumer 184. Similar to FIG. 3A, at block 324, the guides consumption director 114 receives a query or a browsing action from a guides consumer 184. Note that the method of FIG. 3B may fit within the method of FIG. 3A, and therefore, while the ranking step of block 308 is not repeated, it should be understood that this step may again be performed, as can the logging (block 316) and rating (block 320) steps. At block 328, the guides consumption director 114 allows the guides consumer 184 to select and consume guide content.

During the consumption of the guide, at block 332, the guides consumption director 114 asks the guides consumer 184 a question related to the consumed (or accessed) guide. This question may be subject matter-related and may include more than one question. At block 336, the guides consumption director 114 receives a response to the question(s) from the guides consumer 332. At block 340, the guides consumer is linked to another guide based on the response, wherein the other guide is accessible externally from the originally consumed guide. This method is made possible by the system 100 and similar methods such as those described with reference to FIG. 2B wherein inlining or other forms of external linking are provided. In this case, the guide consumption director 114 becomes "smart" in its way of interacting with the guides consumer 184 to enable intelligent linking between related guides. The logger 122 can then continue to log consumption information on the other, related guide or guides as the guides consumer 184 links between these related guides.

Figure 4:
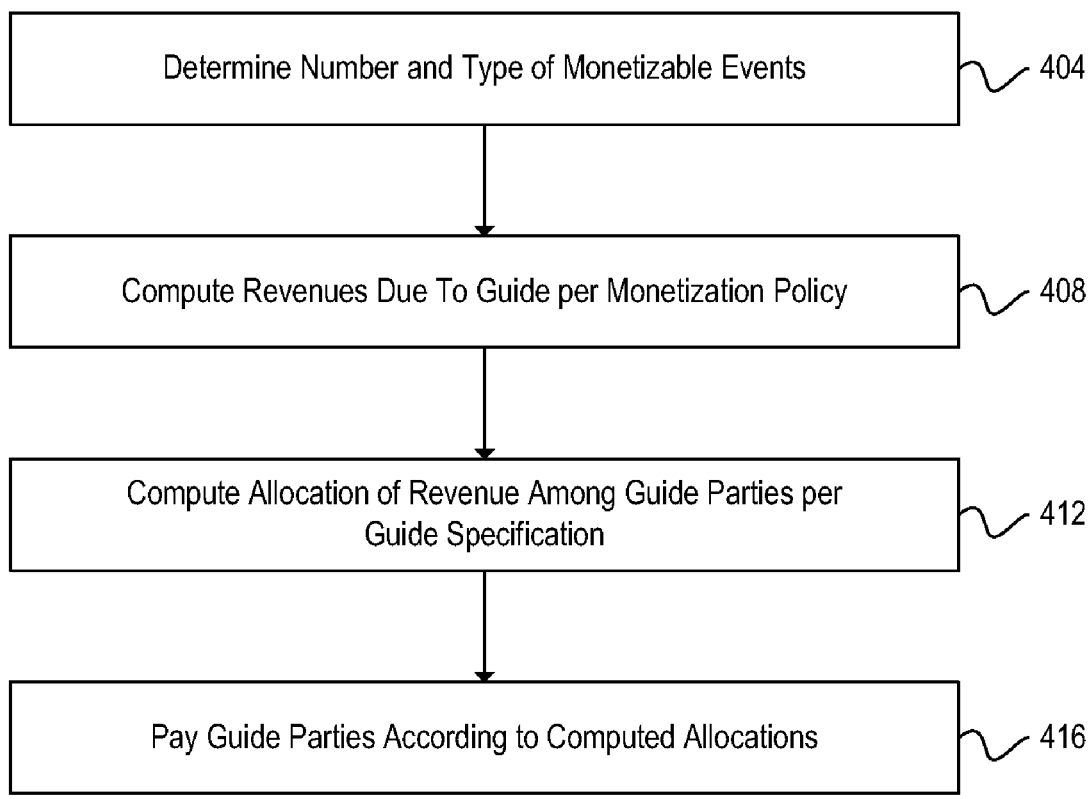
FIG. 4 is a flow chart of an exemplary method for guide monetization using the system depicted in FIG. 1.

FIG. 4 is a flow chart of an exemplary method for guide monetization using the system 100 depicted in FIG. 1. As discussed with reference to FIG. 2A, a guide specification is received from a guides owner 174 before a guide is created, which includes a monetization policy for the guide. Also, with reference to FIG. 3 it was discussed that the logger 122 logs consumption information for payment purposes, which information would be stored in the guides consumption logs database 164. Accordingly, at block 404, the guides offline server 130 determines the number and type of monetizable events for a guide by access to the guides consumption logs database 164. Monetizable events may include page views, ad clicks, impressions, purchases, or other such objective events. At block 408, the payment operator 142 computes revenues due to the guide per the monetization policy associated therewith. At block 412, the payment operator 142 computes the allocation of the computed revenue among guide parties per the guide specification (or configuration). The guide parties may include the owner of the guides system 100 that is serving advertising from the ad server 190, the guide owners 174, and delegates thereof, etc. At step 416, the guide parties are paid according to the computed allocations of revenue sharing.

If a guide is a "free" guide, there will be no monetizable events. Otherwise, the monetization policy could pay the guide owners 174 (or delegates thereof) a flat fraction of total advertising revenues, or some other more complex scheme may be followed, e.g., some sort of gradation fraction scheme. Allocation of revenues by default is exclusively to the guide owners 174, but the guide owners 174 may configure the guide to share revenue among other delegates and/or charities.

One of at least three incentive models may be followed when considering choice of a monetization policy as intimated above. The first is based on the desire of a guides owner 174 to bring in advertising revenue as just discussed. For this monetization policy, a probationary period may be required during which no advertising will be served by the ad server 190. A guides owner 174 under this incentive model would work similar to a standard content provider partner of a search engine or online marketing company, either of which serves advertising with online content. The guides owner 174 may also choose to share all or a portion of earned revenues with delegates as discussed.

The second incentive model is based on sharing advertising revenues with one or more designated charities. Such guides would be designated a "Public Service Charity Sites," and the owner of the system 100 would not keep any revenue generated therethrough.

The third incentive model includes choosing to prohibit advertising and thus collect no revenues. The third incentive may appeal to those who altruistically seek to add to the general body of knowledge available online in the form of guides, as a public service. These guides would accommodate use of creative commons non-commercial licensed material.

The probationary period referred to above is in recognition that bad guides produce weak amounts and/or low quality traffic. No advertisements would be served to a guide during the probationary period, during which time the traffic quantity and quality is assessed. Ratings and evaluations will be part of this assessment; if ratings fall or traffic declines, the probationary period may be restarted. Guides that continue to be poorly rated may never be served advertising, falling under the third incentive by default, or if in the case of accuracy or quality concerns, may be removed altogether. Once a predetermined number of guides consumers 184 rate the content as high quality, and owners of the system 100 obtain a sense of the type of guides consumer 184 that rate the site as high quality, the site would then qualify for advertisement serving, provided it is not a public service site.

Once a guide reaches a threshold level of traffic, e.g., that it is sufficiently popular, the space available for advertising on the guide may be auctioned. The space may be individually auctioned using a keyword-style cascading price auction. Allowing auction of advertising space may induce the guides owners 174 of existing, external guides 180 to import their guides to the system 100 for access by the guides consumers 184.

Both advertising and quality ratings as discussed above drive the growth and relevancy of the guides on the system 100. Certain types of click-fraud, therefore, should be monitored for and addressed. Some fraud is detectable by its geographic concentration, e.g., multiple clicks from a single Internet Protocol (IP) address. Controversial sites should be maintained but search targeted by user type, e.g., liberal and conservative, skilled and unskilled computer user, etc.

Various modifications, changes, and variations apparent to those of skill in the art may be made in the arrangement, operation, and details of the methods and systems disclosed. The embodiments may include various steps, which may be embodied in machine-executable instructions to be executed by a general-purpose or special-purpose computer (or other electronic device). Alternatively, the steps may be performed by hardware components that contain specific logic for performing the steps, or by any combination of hardware, software, and/or firmware. Embodiments may also be provided as a computer program product including a machine-readable medium having stored thereon instructions that may be used to program a computer (or other electronic device) to perform processes described herein. The machine-readable medium may include, but is not limited to, floppy diskettes, optical disks, CD-ROMs, DVD-ROMs, ROMs, RAMs, EPROMs, EEPROMs, magnetic or optical cards, propagation media or other type of media/machine-readable medium suitable for storing electronic instructions. For example, instructions for performing described processes may be transferred from a remote computer (e.g., a server) to a requesting computer (e.g., a client) by way of data signals embodied in a carrier wave or other propagation medium via a communication link (e.g., network connection).

The invention claimed is:

1. A method for creating informational guides, the method executable by a computer coupled with a processor and memory, where the memory includes stored computer instructions, the method comprising:
   receiving, by the computer, a guide specification and a guide content for a plurality of informational guides;
   publishing, by the computer executing the instructions, the plurality of informational guides to a Web-based network for access to users of the network, the plurality of informational guides saved in one or more databases of the memory;
   serving, by the computer executing the instructions, advertising to the plurality of published informational guides;
   rewarding, by the computer executing the instructions, owners of the plurality of published informational guides by providing compensation to the owners based on revenue from the served advertising; and
   allowing the plurality of informational guides to be rated by the users, wherein rewarding the owners is further based on a rating level of the plurality of informational guides.

2. The method of claim 1, further comprising:
   requiring a probationary period for an informational guide during which the guide is rated and traffic thereto logged before displaying advertising on the informational guide; and
   wherein after the probationary period has successfully ended so that advertising is displayed on the informational guide, restarting the probationary period if ratings fall or logged traffic declines below a threshold level.

3. The method of claim 1, wherein rewarding further comprises at least one of:
   listing the highly rated informational guides prominently on a search results page;
   giving a prize to an owner of a highly rated informational guide;

providing a higher percentage of advertising revenue as compensation to owners of highly rated informational guides; and accompanying a results listing that includes highly rated informational guides with an indication that highly rated informational guides are highly rated.

4. The method of claim 3, further comprising:

detecting fraud in the process of allowing the plurality of informational guides to be rated by users, and in the process of rewarding the highly rated informational guides; and removing an owner based on the fraud detection.

5. The method of claim 1, wherein allowing the plurality of informational guides to be rated by the users comprises allowing the users to evaluate the plurality of informational guides, which evaluations are visible to subsequent users of the informational guide.

6. The method of claim 1, further comprising:

logging consumption information of the plurality of informational guides based on network access to the plurality of informational guides by the users, wherein rewarding the owners is further based on the logged consumption information.

7. The method of claim 6, wherein the consumption information comprises at least one of a number of clicks, a dwell time, a purchasing activity and a geography of the users.

8. The method of claim 6, further comprising:

determining a quality score based on user ratings, consumption information, and content of the plurality of informational guides, wherein rewarding the owners is further based on the quality score of corresponding informational guides.

9. The method of claim 6, further comprising:

ranking at least one of the plurality of informational guides based on the content thereof, wherein the content includes monetization information having payment requirements to an owner of the selected at least one informational guide based on the consumption information of the informational guide.

10. A method for creating informational guides, the method executable by a computer coupled with a processor and memory, where the memory includes stored computer instructions, the method comprising:

receiving, by the computer, an informational guide specification including a monetization policy along with guide content from a plurality of guide owners as submissions of a plurality of informational guides, where at least some of the plurality of guide owners determine the monetization policy related to their respective informational guides;

publishing, by the computer executing the instructions, the plurality of informational guides to a Web server for display to users of a Web-based network along with served advertising;

recording, by the computer executing the instructions, user consumption information of the plurality of informational guides related to monetizable events; and computing, by the computer executing the instructions, revenues earned by at least some of the plurality of informational guides according to the respective monetization policies, wherein the monetization policy comprises payment of at least one of a flat fraction of total advertising revenues and a gradation fraction based on the relevancy of a subject matter of the informational guide to the served advertising.

11. The method of claim 10, wherein at least one of the plurality of informational guides comprises more than one owner, the method further comprising:

computing allocation of revenue among the multiple owners of the at least one informational guide as per the guide specification of the at least one informational guide.

12. The method of claim 10, wherein the monetizable events comprise at least one of a number of page views of an informational guide, a number of ad clicks from an informational guide, a number of ad impressions from an informational guide, and another objective measurable event.

13. The method of claim 10, wherein computing revenues defaults to allocate revenues to the plurality of guide owners of the informational guides that attract the monetization events, the method further comprising:

giving the plurality of guide owners an option of sharing the revenues with other contributors to the informational guide.

14. The method of claim 10, wherein user consumption information includes an amount of user traffic attracted by an informational guide, the method further comprising:

detecting a threshold traffic level of clicks on an informational guide; and auctioning advertising space on the informational guide to a plurality of advertisers in response to detecting the threshold traffic level.

15. A method for creating informational guides, the method executable by a computer coupled with a processor and memory, where the memory includes stored computer instructions, the method comprising:

receiving, by the computer, from a guide owner one or more pieces of content for an informational guide;

receiving, by the computer, from the guide owner information with which to identify one or more pieces of structured external informational content;

incorporating, by the computer executing the instructions, the structured external informational content into the content of the informational guide; and publishing, by the computer executing the instructions, the informational guide to a Web-based network for access by consuming users;

wherein the informational guide comprises a first informational guide, the method further comprising:

asking at least one question of a consuming user; and based on a response to the at least one question, linking the consuming user to at least a second informational guide created by a second guide owner that is accessible externally from the first informational guide.

16. The method of claim 15, further comprising:

allowing at least one of the consuming users of the informational guide to interact with the incorporated structured external informational content, wherein the external informational content includes at least one of a data object and a link that references the data object that is stored in an objects database.

17. The method of claim 15, wherein the structured external informational content is incorporated into a predetermined frame of the informational guide that communicates with at least one external data object.

18. A system for creating informational guides, comprising:

a guides online server comprising:

a guide creator operative to receive guide specifications and guide content and create a plurality of guides as specified by a plurality of guide owners, wherein each specification includes at least a monetization policy submitted by a corresponding guide owner that creates incentives for quality guide creation;

a guide consumption director operative to publish the guides on a Web-based network as created by the guide creator and to enable at least one of searching and browsing for guides of varying subject matter;

a logger operative to log consumption information of the guides by Web-based users of the guides;

a guides content database to store the content of the created guides, wherein related guides are associated in memory with each other; and a guides consumption log database to store the log consumption information gathered by the logger.

19. The system of claim 18, wherein the guide creator includes a guide editor for revising and adding to existing guides by the guide owner or by a delegate of the guide owner.

20. The system of claim 18, further comprising:

a guides search index database to store location links to the plurality of guides; and a network interface operative to receive at least one of externally created guides and links thereto, wherein the received externally created guides are saved in the guides content database for availability to consuming users of the guides, and wherein the received links to externally saved guides are saved in the guides search index database.

21. The system of claim 18, wherein the specification of each guide includes a monetization policy, the system further comprising:

a guides offline server comprising:

a reputation computer operative to compute a quality of each guide within a particular setting, which is based on at least user ratings;

an index builder operative to use at least the guide content and the related specifications to build an index that is operative to respond to search queries and browsing actions;

a payment operator operative to implement the monetization policies, including paying revenues to the owner or delegates of the guides based on consumption of advertising served with each guide; and a guides search index database to store the index built by the index builder.

22. The system of claim 21, wherein the quality of each guide is computed based on at least one of user ratings, the consumption information, and the content of each guide, and wherein the index builder comprises a guide for the plurality of guides to aggregate the previously associated related guides in the guides search index database so that browsing users can link between the related guides.

* * * * *